Nov. 7, 1967
G. B. STONE ETAL
3,351,178
ADJUSTABLE CONVEYOR IDLER
Filed Dec. 19, 1966
2 Sheets-Sheet 1
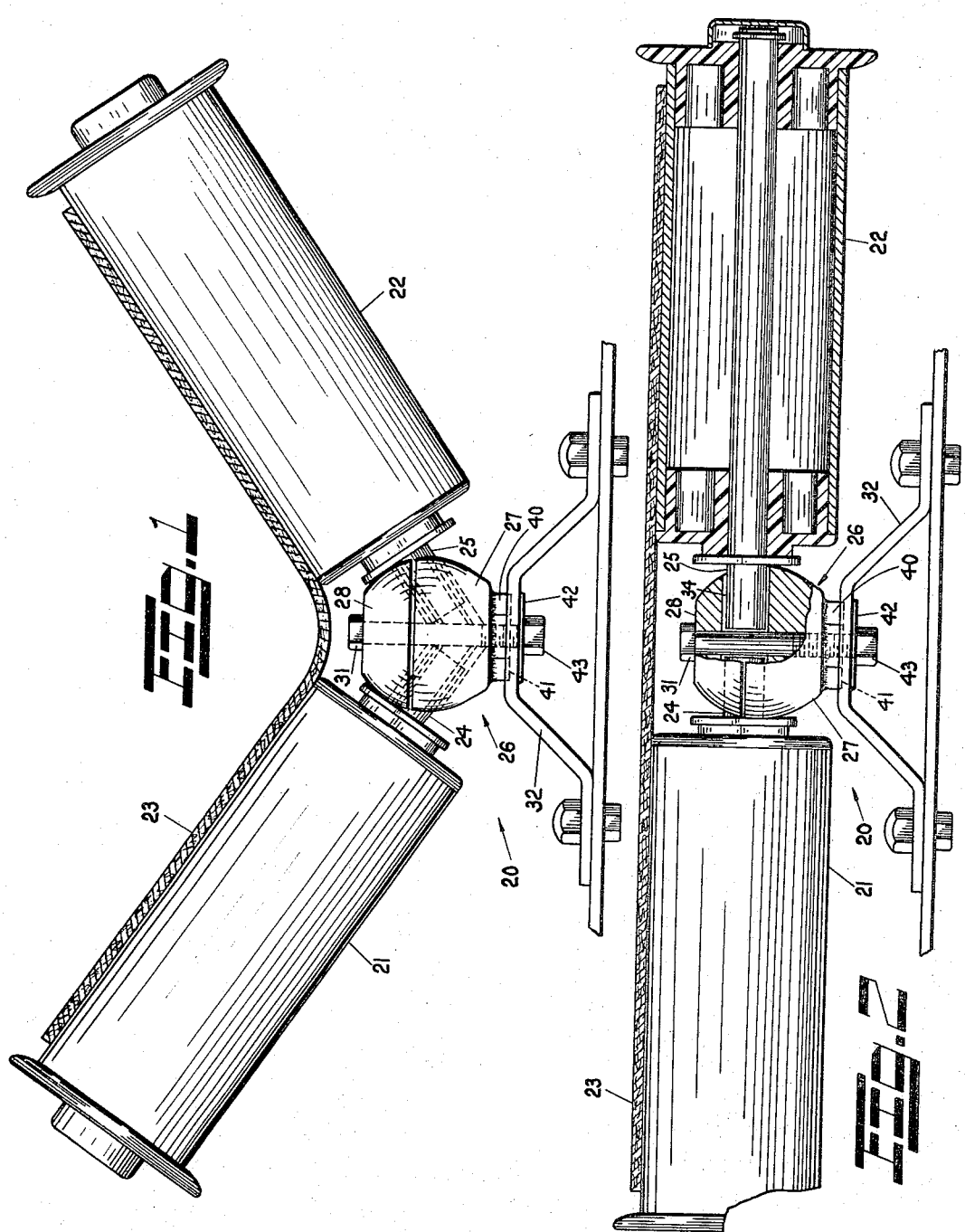
INVENTOR.
GUTHRIE B. STONE
RALPH A. FOLTS
BY
ATTORNEY Nov. 7, 1967  G. B. STONE ETAL  3,351,178
ADJUSTABLE CONVEYOR IDLER
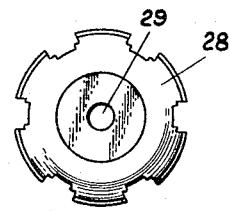
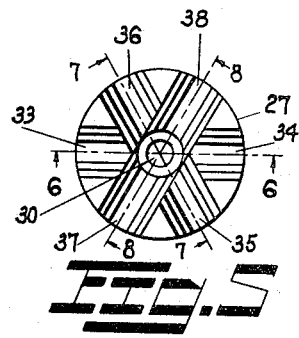
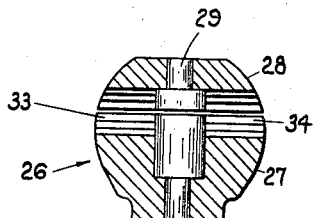
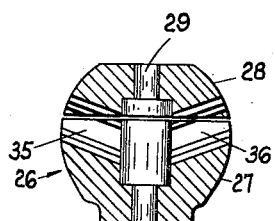
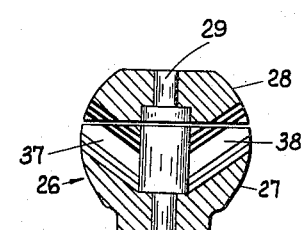
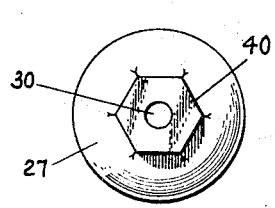
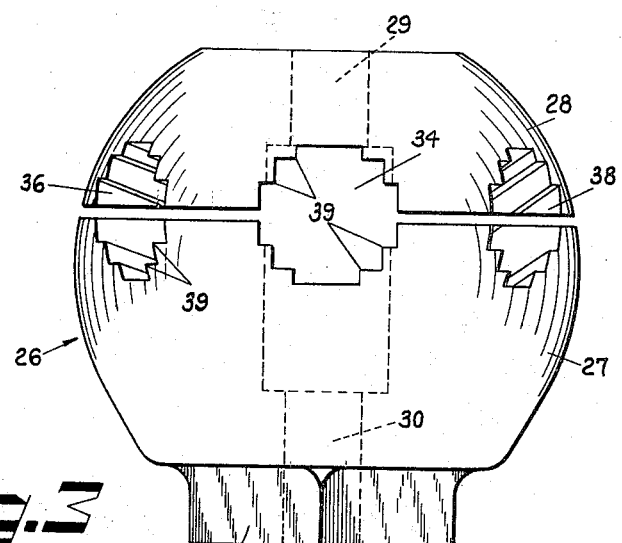
INVENTOR.
GUTHRIE B. STONE
RALPH A. FOLTS
BY
ATTORNEY

# United States Patent Office 3,351,178
Patented Nov. 7, 1967

3,351,178
ADJUSTABLE CONVEYOR IDLER
Guthrie B. Stone, Honeoye, and Ralph A. Folts, Dansville, N.Y., assignors to Stone Conveyor Company, Inc., Honeoye, N.Y., a corporation of New York
Filed Dec. 19, 1966, Ser. No. 602,904
8 Claims. (Cl. 198—192)

ABSTRACT OF THE DISCLOSURE

This invention pertains to endless flexible belt conveyors having opposed idler rollers with roller supporting shafts extending from a centrally disposed shaft positioner element. The positioner element is selectively rotatable and includes angularly and horizontally extending opposed openings selectively positionable whereby the conveying surface of the flexible belt can be converted to either that of a flat or trough type.

The invention

It is a general object of the invention to provide an adjustable conveyor idler assembly in which the belt supporting rollers may be positioned selectively in either a horizontal plane or at an angle to the horizontal.

It is a further object to provide an adjustable conveyor idler assembly which utilizes a minimum number of cooperating components and which does not require special tools or training to position the supporting rollers in a desired position.

A further object is that of providing an adjustable conveyor idler assembly which is relatively inexpensive to manufacture and which requires a minimum amount of attention and maintenance.

A still further object is that of providing an adjustable conveyor idler, assembly characterized by its simplicity and dependability.

Further objects and advantages of the invention will become apparent from the following more detailed disclosure.

The changing of the conveying surface of a flexible belt conveyor into a flat conveying surface or one that forms a trough is well known to those conversant with art. With the known types of conveyor mechanisms which can be adjusted to present either a flat or troughing belt surface there are certain factors which are not considered particularly advantageous such as the complexity of the mechanisms which in many cases requires considerable experience and special tools to make such a conversion. Additionally, many such mechanisms require what is considered an excessive amount of conveyor down-time to make a change of this sort and are considered impractical economically.

A simplified form of converting a flexible belt conveyor from one type of conveyor to another is shown and described in U.S. patent application No. 551,007, filed May 18, 1966. This conveyor utilizes opposed idler roller supporting shafts supported in opposed sockets provided in a centrally disposed mounting block. The supported ends of the shafts are displaced axially and by simply rotating said shafts 180°, the flexible belt can be made to take either the form of a flat or troughing type conveyor.

The present invention discloses another simplified means of converting a flexible belt conveyor and provides a choice of angular settings for the idler roller support shafts in addition to their setting which permits them to function in a horizontal plane.

The variety of shaft positions selectively available provided by the shaft positioner element comprising the instant invention permits the conveyer to be changed from one form to another with a minimum of delay and without the need for special tools.

The invention will be described hereinafter in greater detail by reference to the accompanying figures of drawing in which:

FIG. 1 is a view in end elevation showing one of the selective angular positions at which the belt supporting idler rollers may be positioned to provide a conveying surface of the troughing type;

FIG. 2 is a view similar to that of FIG. 1 and partially in section but showing the idler rollers in a horizontal plane which provides a flat conveying surface;

FIG. 3 is a view in side elevation of the shaft positioner element according to the invention showing the base portion and clamping cap with the shaft supporting openings formed therebetween;

FIG. 4 is a top view of the clamping cap shown in FIG. 3;

FIG. 5 is a top view of the base portion of the shaft positioner member in FIG. 3 showing the pairs of opposed openings for the selective positioning of the idler roller shafts;

FIG. 6 is a sectional view taken along line 6—6 of FIG. 5 showing the opposed openings for supporting the idler roller shafts in a horizontal plane;

FIG. 7 is a view similar to FIG. 6 but taken along line 7—7 of FIG. 5 showing a pair of opposed openings for supporting the idler roller shafts in one of the selectively available angular positions;

FIG. 8 is a view similar to FIG. 7 but taken along line 8—8 of FIG. 5 showing another pair of opposed openings for supporting the idler roller shafts in another angular position; and FIG. 9 is a bottom view of the base portion illustrated in FIG. 3 showing the means by which it is maintained in a selected position on the supporting structure therefor.

Referring now to the figures of drawing, there is shown in FIGS. 1 and 2 an idler roller assembly for a flexible, endless belt type conveyor and is identified generally by numeral 20.

This assembly is provided with a pair of opposed roller members 21 and 22 which are adapted to support and guide a flexible conveyor belt 23 as it is caused to move across the upper and outer surfaces of the roller members 21 and 22. The roller members 21 and 22 are rotatably assembled on idler roller shafts 24 and 25, respectively, which are supported by a shaft positioning member generally indicated by numeral 26.

This shaft positioning member is generally ball shaped and includes a base element 27 and a clamping cap element 28. As shown in FIGS. 6, 7 and 8, the cap element 28 is provided with a centrally disposed and vertically extending opening 29 and in assembled position this opening is in vertical alignment with a similar opening 30 provided in the base element 27.

A bolt 31 assembles in opening 29 of the cap element and extends through opening 30 beyond the lower limits of the base element 27 and provides a means to be more fully described for mounting the shaft positioning member 26 on an idler assembly support shown and identified in FIGS. 1 and 2 by numeral 32.

The shaft positioning member 26 is provided, as shown in the various figures of drawing, with opposed openings which can be positioned selectively to support the idler roller shafts 24 and 25 in a horizontal plane as shown in FIG. 2 or either of the two available angular settings, one of which is shown in FIG. 1. These openings, as shown in FIG. 3, are formed as part of both the cap and base elements and FIGS. 5 and 6 show the horizontal openings which are identified by numerals 33 and 34, respectively.

FIGS. 7 and 8 show the opposed openings which provide the two available angular settings of the idler roller shafts. Although these openings may be formed at any desired angle, for explanation purposes, the openings 35 and 36 in FIG. 7 are shown on a 20° angle and the openings 37 and 38 in FIG. 8 are shown on a 35° angle.

Each of the openings is formed by a plurality of ridges 39 (FIG. 3) which are in step form and extend for the longitudinal extent of each opening.

These ridges 39 provide gripping surfaces for fixedly positioning the idler roller shafts in the openings selected when the bolt 31 is tightened to draw the cap element 28 into close proximity with the base element 27.

The lowermost portion of the base element 27 has a hexagonal configuration which is identified by numeral 40 in FIG. 9 and is adapted to be received into a recess 41 of conforming configuration provided in the idler assembly support 32. The threaded portion of bolt 31 extends through and below the central and elevated portion of the idler assembly support 32 and is adapted to have a washer 42 and nut 43 (FIGS. 1 and 2) assembled thereon.

In operation, the endless flexible conveyor belt is caused to move across the upper and outer surface of the idler rollers, and the shafts which support said rollers can be positioned selectively to provide either a flat conveying surface or one which forms a trough for conveying loose materials.

To change from one type of conveyor to another one simply loosens the nut 43 of bolt 31 which permits the idler rollers and their supporting shafts to be removed from the idler assembly. The shaft positioning member is then raised a sufficient distance to clear the recess 41 and rotated until the desired opposed openings are directed toward the sides of the belt or in other words in a plane normal to the direction of movement of said belt. The shaft positioning member is then lowered into the recess 41 and the ends of the roller supporting shafts inserted into the selected pair of opposed openings. Nut 43 is then tightened and the conveyor is in operating condition.

While one embodiment of the invention has been disclosed, it is to be understood that the inventive concept may be carried out in a number of ways. This invention is, therefore, not to be limited to the precise details described, but is intended to embrace all variations and modifications thereof falling within the spirit of the invention and the scope of the claims.

We claim:

1. A belt support idler assembly for endless belt conveyors comprising
   (a) opposed shaft members,
   (b) belt supporting rollers rotatably assembled on said shaft members,
   (c) an idler assembly support having a shaft positioning member assembled thereto,
   (d) said shaft positioning member including at least two pairs of opposed openings therein for receiving and supporting said shaft members, the openings of one of said pairs being directed to support said shafts in an angular relationship different from that of the other of said pairs, one of said pair of openings is in a vertical plane which intersects another vertical plane in which the other pair of openings is located, and mounting means to permit selective rotation of the positioning member whereby shaft positions can be changed to effect flat and varied troughing configurations of the belt supported by said rollers.

2. The belt support idler assembly according to claim 1 wherein said shaft positioning member comprises a base element and a clamping cap element having said pairs of openings formed as part of each of said elements.

3. The belt support idler assembly according to claim 2 wherein said base element includes a hexagonal lower end receivable into a recess of conforming configuration coined in the upper surface of said idler assembly support.

4. The belt support idler assembly according to claim 3 wherein said shaft positioning member includes a centrally disposed locking bolt extending therethrough for fixedly positioning said shafts in said pairs of openings and said positioning member in said recess of said idler assembly support.

5. A shaft positioning member for supporting idler roller shafts in a conveyor having a flexible endless belt supported and guide by opposed roller members rotatably mounted on said shafts, said positioning member including,
   (a) at least two pairs of opposed openings for receiving and supporting the adjacent ends of said shafts,
   (b) an idler assembly support for mounting said shaft positioner member,
   (c) said positioning member including an adjustment means for selective rotation thereof on said idler assembly support for placing a selected pair of said openings in a position for supporting said shaft in a plane normal to the movement of said belt over said rollers, the openings of one of said pairs being directed to support said shafts in an angular relationship different from that of the other of said pairs whereby shaft positions are selectively changeable to effect flat and varied troughing configurations of said flexible belt.

6. The shaft positioning member according to claim 5 wherein said shaft positioning member includes a base element and a clamping cap element having said pairs of openings formed as part of each of said elements.

7. The shaft positioning member according to claim 6 wherein the adjustment means for the latter includes a hexagonal lower end of said base portion receivable into a recess of conforming configuration provided in said idler assembly support.

8. The shaft positioning member according to claim 7 wherein said base and cap elements include a centrally and vertically disposed bolt extending therethrough for fixedly positioning said shafts in a selected pair of said openings and said positioning member in said recess of said idler assembly support.

References Cited

FOREIGN PATENTS 562,060   6/1944   Great Britain.
981,617   1/1965   Great Britain.
295,274  12/1953   Switzerland.

GERALD M. FORLENZA, *Primary Examiner.*

R. J. HICKEY, *Assistant Examiner.*